United States Patent [19]
Daehnert

[11] 3,730,703
[45] May 1, 1973

[54] HARVESTING AID

[75] Inventor: Raymond H. Daehnert, Tustin, Calif.

[73] Assignee: Allied Chemical Corporation, New York, N.Y.

[22] Filed: June 16, 1966

[21] Appl. No.: 557,928

[52] U.S. Cl. ................................................. 71/69
[51] Int. Cl. ............................................. A01n 11/00
[58] Field of Search ................................. 71/69, 65

[56] References Cited

UNITED STATES PATENTS

| | | |
|---|---|---|
| 3,515,535 | 6/1970 | Lindsey ................................ 71/65 |
| 1,625,608 | 4/1927 | Holmes ................................ 71/65 |
| 1,803,157 | 4/1931 | Wesenberg et al. ............... 71/65 X |
| 1,913,141 | 6/1933 | Offord et al. ....................... 71/65 |
| 1,997,750 | 4/1935 | Sauchelli ............................ 71/65 |

OTHER PUBLICATIONS

Federal Register, 30, 9002, 1965.

*Primary Examiner*—James O. Thomas, Jr.
*Attorney*—Arthur J. Plantamura

[57] ABSTRACT

Chemical desiccation and defoliation of crop bearing plants, e.g., cotton, may be effected by treatment of the plant with an effective amount of ammonium thiosulfate.

10 Claims, No Drawings

HARVESTING AID

This invention relates to novel defoliating and desiccating compositions and to methods of employing the same to facilitate harvesting of growing crops.

Chemical defoliation and/or desiccation of the above surface foliage of growing crops, as an aid to harvesting of such crops, are widely practiced procedures. Defoliation in this context refers to the complete removal or detachment of leaves from the plant before natural defoliation takes place. Desiccation refers to a state in which the leaves are dried and shriveled but remain attached to the plant. Desiccation or removal of foliage serves the purpose of rendering the crop beneath more readily accessible for mechanical harvesting operations or for hand picking. In addition, ripening of the crop situated in the lower part of the plant is hastened since otherwise the crop would be shielded from circulating air and sunlight by the dense foliage. This is particularly significant in the cotton industry, for example, where increased exposure to sun and increased air circulation cause the mature cotton bolls to open faster, thereby preventing or reducing boll rot and retarding fiber and seed deterioration. Another advantage of defoliation or desiccation is that crops can be harvested earlier than would be possible if the plants were permitted to defoliate naturally. This is of particular advantage to avoid the effects of frost or other adverse weather conditions. Desiccation or defoliation may also decrease the degree of damage done by insects or other pests to the crop due to the removal of a food source for such pests which attracts and maintains the same.

Chemical defoliation or desiccation may be advantageously practiced on a variety of crop-bearing plants. The term "crop-bearing plants" is intended to comprehend seed crops which are harvested and used to propagate the plants. Examples of such crop-bearing plants include cotton, soy bean, sugar beet, sorghum grain, alfalfa, lima bean, rice, tomato, milo, citrus fruit, Sudan grass, potato, Ladino clover and red clover.

Of the two activities, defoliation and desiccation, the former is generally preferred. This is because, with desiccation, retention of the dried leaves on the plant results in the contamination of the harvested crop with dried leaf particles, upon harvesting, thereby complicating separation and purification procedures. It is accordingly high desirable to achieve a significant degree of defoliation in combination with desiccation if the latter procedure is used as a harvesting aid. Accompanying defoliation to the extent of 10 percent of the plants, for example, will result in substantial savings in crop purification efforts. This is especially true in the cotton industry where the dried leaf particles, or "trash" as they are commonly referred to in the trade, are particularly difficult to remove from the cotton bolls.

It is accordingly a major object of this invention to provide a novel defoliating and/or desiccating agent which consistently produces either defoliating or desiccating effects or both on a variety of crop-bearing plants.

It is a more specific object of the invention to provide methods of achieving consistently effective desiccation in crop-bearing plants coupled with a significant degree of defoliation therewith.

Other objects and advantages will become apparent from the forthcoming discussion.

I have found that ammonium thiosulfate, $(NH_4)_2S_2O_3$, fulfills the above stated objects when used as the active ingredient to treat growing crop-bearing plants.

The defoliating and desiccating properties found to be possessed by ammonium thiosulfate were surprising in view of the state of the art and particularly in view of the previously known properties of this material. U.S. Pat. No. 3,152,879 to Yale discloses that various ammonium salts, viz. ammonium sulfate, ammonium nitrate and ammonium chloride possess defoliating and desiccating properties on crop producing plants. The ammonium salt, ammonium thiosulfate, is conspicuous by its absence in this list. Patentee Yale's teaching is that only the above three mentioned ammonium salts possess defoliating and desiccating properties and that other ammonium salts, as illustrated by ammonium sulfite, ammonium polysulfide, ammonium carbonate and ammonium bicarbonate, fail to exhibit such activity. From such a disclosure, one would be led away from the fact that another ammonium salt, and particularly a sulfur containing ammonium salt, viz. ammonium thiosulfate, would exhibit desiccating and defoliating activity. This is particularly true in view of the teachings of Wesenberg et al. in U.S. Pat. No. 1,803,157 that thionic acid salts have growth stimulating properties. In view of the above pertinent prior knowledge, it was accordingly surprising to find that a thionic acid salt, viz. ammonium thiosulfate, possesses defoliating and desiccating properties.

Ammonium thiosulfate, at standard conditions, is a white crystalline solid. Commercial grade is normally about 97 percent pure and is quite satisfactory for use in accordance with the invention. Impurities may include, for example, ammonium sulfite and ammonium dichromate.

Ammonium thiosulfate is conveniently and effectively employed for defoliating and desiccating functions, as the active ingredient in formulations including carriers or dispersion mediums, which may be solid or liquid. The preferred dispersion medium is water in which ammonium thiosulfate is extremely soluble.

A suitable water solution of ammonium thiosulfate is available commercially on the market as Amthio (trademark of Allied Chemical Corporation), which consists essentially of a 60 percent solution of ammonium thiosulfate by weight in water (1.33 lbs. of nitrogen per gallon). Amthio is a clear, slightly tinted liquid characterized by an ammoniacal odor and contains approximately 12 percent nitrogen and 26 percent sulfur by weight and weighs about 11.1 lbs. per gallon. Amthio may be used, as is, or additional water may be added if desired.

Any other inert solvent for ammonium thiosulfate, which will not produce an adverse effect on the crops, may be utilized as dispersion medium. Other liquid carriers may also be employed which, while not good solvents for ammonium thiosulfate, may serve as effective carriers, with or without water, by the use of emulsifying agents which cause effective suspension or dispersion of the active ammonium thiosulfate ingredient. Preparation of such suspensions is within the skill of the art and may, for example, be of the water-in-oil type or the oil-in-water type. Illustrative suitable emulsifiers include water soluble alkyl sulfonates, water soluble aryl sulfonates, sodium and potassium salts of fatty acids and fatty acid esters of polyhydric alcohols. Inert solid carriers such as talc, natural clays, diatomaceous earth, colloidal silica and fuller's earth may be employed in the preparation and use of sprayable dusts. The amount of carrier employed is not critical but should be sufficient to keep the active ammonium thiosulfate ingredient in suspension.

The dosage of active ammonium thiosulfate ingredient which is employed will vary depending upon the type of plant organism involved and upon local conditions. In any event, the dosage preferred is that amount which is sufficient to effect a significant degree of defoliation in combination with desiccation of the plant foliage. If the dosage is too low, inadequate defoliation and desiccation will result. If the dosage is too high, increased desiccation will result at the sacrifice of defoliation. It has been found, for example, in the case of cotton plants that a dosage of about 10 gallons of 60 percent ammonium thiosulfate per acre, corresponding to an active ammonium thiosulfate dosage of about 66.5 lbs. per acre, is effective to achieve a significant degree of defoliation in combination with effective desiccation of the cotton plant foliage. (The term 60% ammonium thiosulfate refers to a 60 weight percent solution of ammonium thiosulfate in water.) On cotton plants, it has been found that maximum defoliation results with between about 10–20 gallons of 60 percent ammonium thiosulfate per acre. This corresponds to an active ammonium thiosulfate dosage of about 66.5–133 lbs. per acre. Defoliation has been found to fall off at dosages of about 20 gallons of 60 percent ammonium thiosulfate per acre and above and for cotton defoliation, dosages in excess of about 30 gallons of 60 percent ammonium thiosulfate per acre (200 lbs. ammonium thiosulfate per acre), are not recommended.

The ammonium thiosulfate formulations may be applied by spraying in solutions, emulsions, mists or dusts.

Other ingredients may be incorporated in the ammonium thiosulfate formulations such as spreaders or stickers, e.g. gum arabic, carboxymethyl cellulose and polyvinyl alcohol, which materials serve to retain the active ingredient on the plant surfaces for longer periods of time and also agriculturally active materials, e.g. insecticides, fertilizers and other defoliating or desiccating agents.

The following examples illustrate practice of the invention. Percent desiccation, where given, refers to the percent of desiccated leaves on the plants at the time of observation and does not include leaves that defoliated.

EXAMPLE 1

A 60 percent ammonium thiosulfate solution was applied at the rates of 12 and 20 gallons per acre to .04 acre plots of Acala cotton plants. The cotton ranged from 3–4½ feet in height. Soil was a clay loam variety. The cotton crop was mature with bolls about ready to open. Temperature at the time of application was about 85°F. As a check, an ammonium polysulfide solution containing 1.9 lbs. nitrogen per gallon was applied at the rate of 20 gallons per acre to equivalent acreage. Evaluation of defoliation and desiccation effects was made 2 weeks after application. The results are shown in the following table.

TABLE I

| Test Material | Percent Defoliation | Percent Desiccation |
|---|---|---|
| 60% ammonium thiosulfate (12 gal./acre) | 15 | 70 |
| 60% ammonium thiosulfate (20 gal./acre) | 17 | 80 |
| Ammonium polysulfide solution | No Apparent Response | |

EXAMPLE 2

Defoliation/desiccation tests with 60 percent ammonium thiosulfate were run on Acala cotton in 5 acre blocks with application rates of 20 gallons, 15 gallons and 10 gallons per acre. The cotton ranged from 3 feet to 6 feet in height. Soil was a clay loam variety with alkali spots. The cotton drop was mature with estimated 80 percent of bolls open. Desiccation and defoliation effects were evaluated 1, 4 and 8 days after application. The results are reported in the following table.

TABLE II

| | Days After Application | 60% ammonium thiosulfate (gal./acre) | | |
|---|---|---|---|---|
| | | 20 | 15 | 10 |
| Desiccation | 1 | Excellent | Good | Good |
| Defoliation | 1 | Poor | Poor | Poor |
| Desiccation | 4 | Excellent | Excellent | Good |
| Defoliation | 4 | Fair | Fair | Fair |
| Desiccation | 8 | Excellent | Excellent | Excellent |
| Defoliation | 8 | Fair | Good | Good |

Defoliation
  poor = less than 10% leaf drop.
  fair = 10 to 25% leaf drop.
  good = 25 to 50% leaf drop.
Desiccation:
  good = 75–90%
  excellent = more than 90%

EXAMPLE 3

60 percent ammonium thiosulfate was tested as a desiccant for alfalfa. 60 percent ammonium thiosulfate was applied at the rates of 15 and 30 gallons per acre to 1/800 acre plots of alfalfa in the flowering stage. Desiccation effects were evaluated 1, 2, 3 and 7 days after application. The results are shown in the following table:

TABLE III

| RATE | Elapsed Time After Treatment | | | |
|---|---|---|---|---|
| RATE | 1 day | 2 days | 3 days | 7 days |
| 15 | 3–4 | 4 | 4–5 | 8–10 |
| 30 | 3–4 | 6 | 9 | 10 |

Injury or desiccation rating:
  0 = no effect
  1–3 = light effect
  4–6 = moderate effect
  7–9 = severe effect
  10 = complete white to golden burn and dried out appearance

I claim:

1. The method of facilitating harvest of a crop-bearing plant comprising treating the above surface foliage of said plant with ammonium thiosulfate in an amount required to effect desiccation of the plant.

2. The method according to claim 1 in which the ammonium thiosulfate is dispersed in a carrier therefor.

3. The method according to claim 2 in which the carrier is water.

4. The method according to claim 3 in which the amount of ammonium thiosulfate employed is sufficient to effect accompanying defoliation of the plant.

5. The method according to claim 3 in which the crop-bearing plant is a cotton plant.

6. The method according to claim 5 in which the amount of ammonium thiosulfate employed is sufficient to effect accompanying defoliation of the plant.

7. The method according to claim 5 in which the cotton plant is treated with at least about 66.5 lbs. per acre of ammonium thiosulfate.

8. The method according to claim 7 in which the cotton plant is treated with no more than about 200 lbs. of ammonium thiosulfate per acre.

9. The method according to claim 8 in which the cotton plant is treated with between about 66.5–133 lbs. ammonium thiosulfate per acre.

10. The method of defoliating and desiccating plants which comprises treating the foliage of said plants with an effective amount of ammonium thiosulfate.

* * * * *